United States Patent [19]

Lichtman

[11] 4,050,819

[45] Sept. 27, 1977

[54] UNDERSEA RANGING-COMMUNICATIONS FROM ALTITUDE VIA LASER

[75] Inventor: Samuel W. Lichtman, San Diego, Calif.

[73] Assignee: The United States of America as represented by the Secretary of the Navy, Washington, D.C.

[21] Appl. No.: 702,267

[22] Filed: July 2, 1976

[51] Int. Cl.² .................. H04B 9/00; G01C 3/08
[52] U.S. Cl. .................... 356/51; 250/199; 356/5
[58] Field of Search .................. 356/3, 4–5, 356/51; 250/199; 340/189 R, 189 M, 190, 5 H

[56] References Cited

U.S. PATENT DOCUMENTS

| | | |
|---|---|---|
| 3,446,555 | 5/1969 | Kahn .................................. 356/5 |
| 3,604,803 | 9/1971 | Kahn .................................. 356/5 |
| 3,869,618 | 3/1975 | Lax et al. ........................... 250/199 |

Primary Examiner—John K. Corbin
Assistant Examiner—Wm. H. Punter
Attorney, Agent, or Firm—R. S. Sciascia; G. J. Rubens; T. M. Phillips

[57] ABSTRACT

An optical means for detecting and/or communicating with underwater objects from airborne platforms wherein a number of laser sources are collimated so as to illuminate a particular portion of the ocean surface from the airborne platform. Thereafter, use is made of the non-linear optical phenomena resulting from the interaction of the various source characteristics (power and wavelength) with the water media to detect modulation of the specularly reflected energy to provide indications of the presence of submerged objects.

10 Claims, 5 Drawing Figures

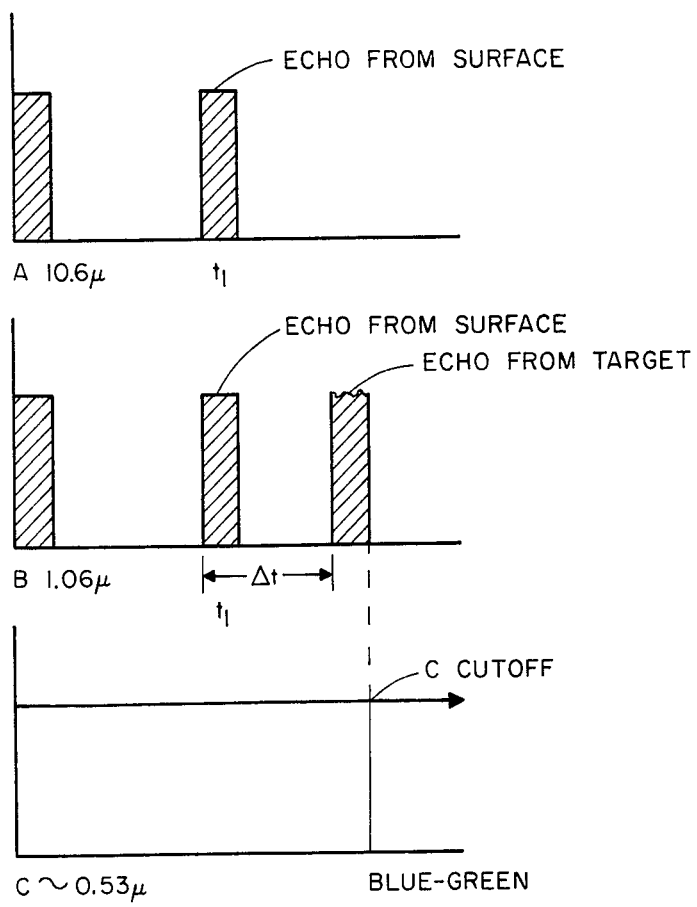
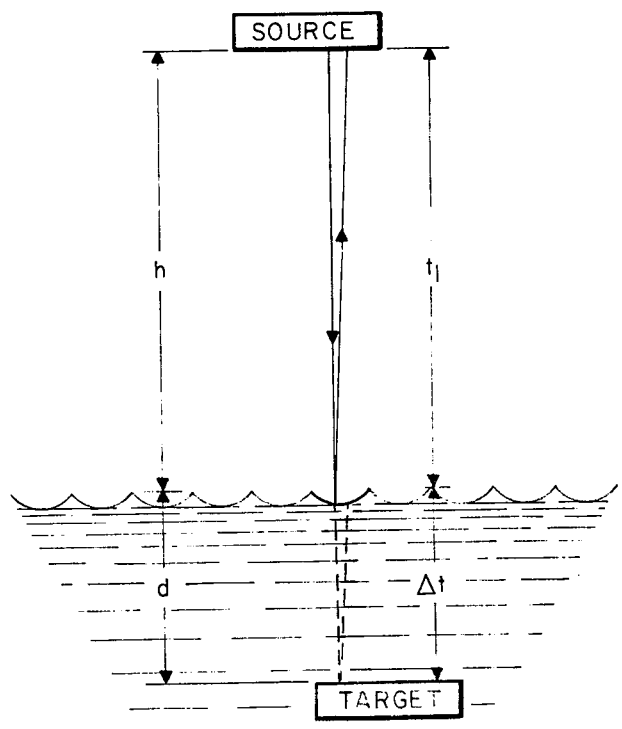
Fig. 4a
Fig. 4b

UNDERSEA RANGING-COMMUNICATIONS FROM ALTITUDE VIA LASER

BACKGROUND OF THE INVENTION

Echo energy from a diffuse reflective target decays by spherical spreading. For a submerged target at depth $d$, and a ranging system at height $h$, above the surface, where $h$ is greater than $d$, maximum working range, $h$, is controlled by the spherical spreading loss.

In the interaction of light with matter, the linearity of classical optics has always been regarded as a first approximation. Extensive experimental studies of non-linear optical effects became practical with the advent of lasers. By means of lasers highly monochromatic beams of great power, up to tens of thousands of megowatts, can now be obtained. The electromagnetic field of such beams are still considerably weaker than the intermolecular Coulomb fields, which are of the order of $10^7$–$10^9$ v/cm, but they are comparable to and sometimes stronger than, the fields that determine the probabilities of non-optical transitions and spontaneous emissions and causing splitting, shifts and broadening of the energy levels of transitions (intramolecular and magnetic intramolecular intereactions, and interactions with the vacuum electromagnetic field). It therefore becomes obvious that many spectral properties of molecules can be considerably altered by the action of intense laser light. These changes are not only responsible for the non-linear laws of propagation of intense light beams in matter (self-focusing, interaction of electromagnetic waves, and other effects) but they can also manifest themselves in the process of spontaneous emission (luminescence and scattering) and absorption of weak light from a separate source.

Light intensities required for satisfactory observation of the effects of radiation on the non-linear states and properties of molecules have been estimated to be on the order of 1MW/cm$^2$. This is easily achieved. A criterion for this estimate was a relaxation time $\tau$ for the molecular populating levels, as determined by the probability of spontaneous emission and non-optical transitions, of $\tau >> 10^{-9}$SEC. For shorter relaxation times, in which molecules might accumulate, the population of the level will be non-linear at lower light intensities.

Laser beam energy densities much in excess of the threshold for non-linear effects and sufficient to bring about a liquid to vapor change of state in water, and by thermal shock to produce acoustic pulse rupture of the free liquid surface is commonplace knowledge.

Consider a medium with a square law propagation characteristic (i.e., input/output), A, for an incident light field E, or $$A \alpha E^2 \quad (1)$$

Assume that the incident light consists of two monochromatic waves $$E_1 = E_{01} \cos(\omega_1 t - \phi_1)$$

$$E_2 = E_{02} \cos(\omega_2 t - \phi_2) \quad (2)$$

The substituting Equation (2) into Equation (1) results in the well known non-linear-combining spectral terms, that include four new frequency components, $2\omega_1$, $2\omega_2$, $\omega_1 + \omega_2$ and $\omega_1 - \omega_2$.

SUMMARY OF THE INVENTION

The present invention provides a system for detecting and/or communicating with a submerged target. Three co-located and boresighted laser beams of identical beamwidths are directed in the direction of the submerged target. Two of the laser beams are infrared sources and do not penetrate the water. The third laser beam is a blue-green water penetrating light source.

The first laser beam, 10.6$\mu$, should be projected onto the sea surface with sufficient beam energy density to induce non-linear propagation over the illuminated region. Sensitizing as used herein is defined as optically stressing a sea surface region with sufficient energy density to induce non-linear propagation over the illuminated region. The spot so illuminated is sensitized so that cross modulation occurs for other light sources that may traverse this region.

The second laser beam source, 1.06$\mu$, should be projected to the sensitized spot with sufficient size to encompass several lengths of surface water waves. The second laser beam serves to range on the sea surface, from $h$, by detecting specular reflective returns from the sea surface. With the spot size large enough to encompass several lengths of surface water waves, detection of specular returns from an undulating surface is possible.

The third laser beam source, 0.53$\mu$, passes through the sea surface and when reflected from a diffuse reflective target modulates the second laser beam when both are in the sensitized zone near the water surface. Circuit means are provided to extract the echo signature of the target from the modulated beam by demodulation at the source height location.

For maximizing the amplitude modulation of the second laser beam by the echo of the third beam, the second and third laser beams energy levels should be matched approximately, within the sensitized region.

Accordingly an object of the invention is the provision of a means of detecting a submerged target from greater heights than otherwise possible.

Another object of the invention is the provision of a system which eliminates spherical spreading losses of echo returns from a diffused reflective target as a limiting factor to detections from height $h$.

Another object is the provision of a means for effecting echo ranging on a submerged target and/or communication therewith, from heights no longer limited by spherical spreading losses of the echo return.

Still another object of the invention is the effective echo ranging on a submerged target by modulating an optical near infrared (1.06$\mu$) carrier with an optical echo signal (0.53$\mu$) from a diffuse reflective submerged target, by non-linear propagation conditioning of the common intercept volume, situated on the water surface, through the use of a far infrared (10.6$\mu$) optical beam.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 4a-b shows the automated depth determination.

DESCRIPTION OF THE PREFERRED EMBODIMENT

Figure 1:
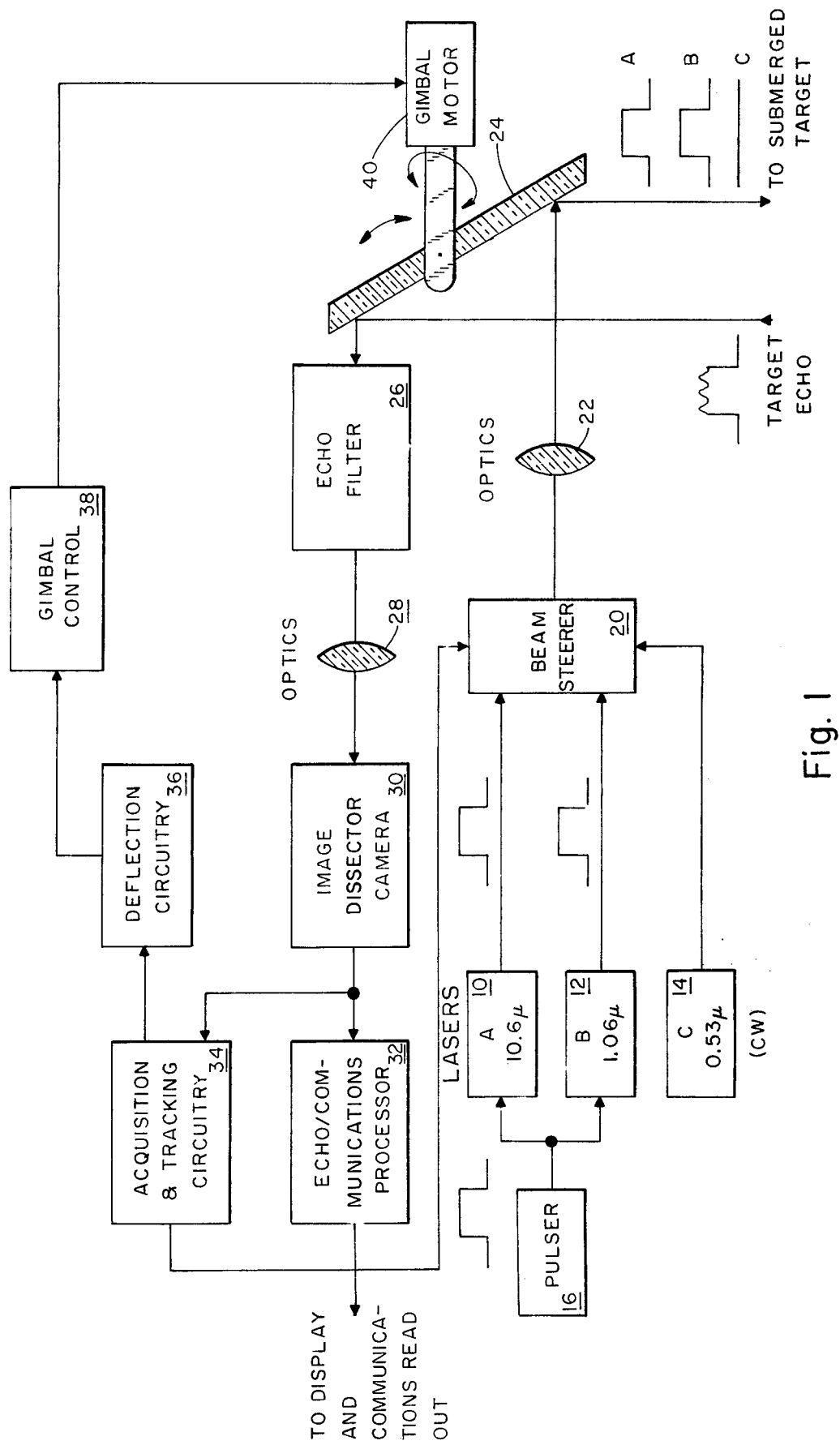
FIG. 1 is a block diagram of a preferred embodiment of the invention.

Referring now to FIG. 1 of the drawing wherein there is shown a preferred embodiment of the detection system, there are shown three laser sources 10, 12 and 14. Laser 10 is an infrared laser ($CO_2$) operating at the far infrared spectrum (10.6μ). Laser 12 is an infrared laser (Nd:YAG) operating in the near infrared spectrum (1.06μ). Lasers 10 and 12 are each pulsed by means of a pulser 16 to provide pulses of infrared laser energy. Laser 14 is a blue-green laser (double Nd:YAG) operating in the blue-green spectrum (0.53μ) which is a continuous wave. All three lasers are fed to a beam steerer 20 which operates in the well known manner to steer all three beams towards the target which are collimated by optical lens 22 and directed onto scanning mirror 24 for transmission in the direction of a submerged target. The reflected echo target signal is intercepted and reflected by rotating mirror 24 through echo filter 26 and optics 28 to image dissector camera 30. The signal output from image dissector camera 30 is fed to processor circuit 32 and to the acquisition and tracking circuitry 34. Processor circuit 32 detects the information and feeds it to display and readout circuitry (not shown). The acquisition and tracking circuit 34 provides a tracking signal which is fed to beam steerer 20 and to deflection circuitry 36 for providing a control signal to Gimbal control circuit 38. Gimbal control circuit 38 provides the control signal for Gimbal motor 40 which drives rotating mirror 24.

Figure 2:
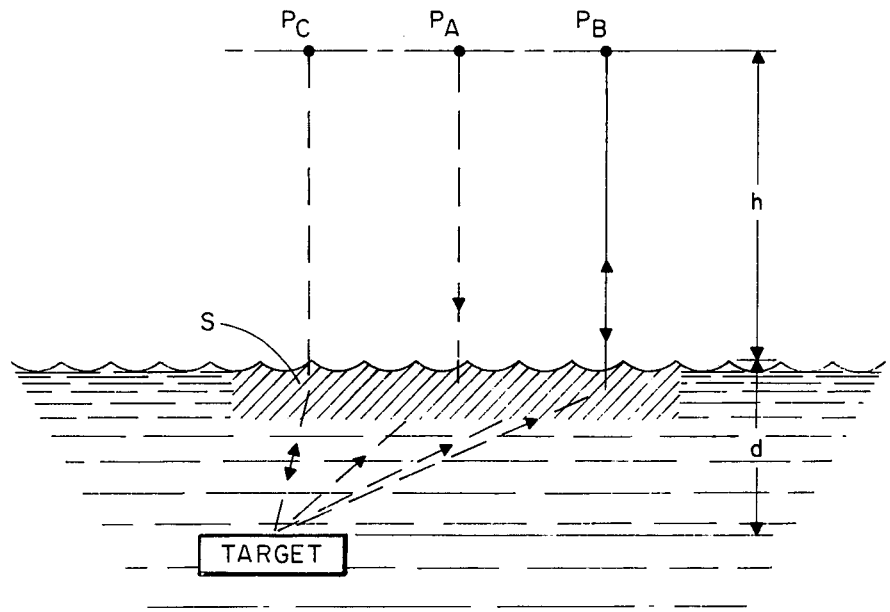
FIG. 2 illustrates the principal of target signal cross modulation.

In operation and referring to FIG. 2, when the 10.6μ laser beam $P_A$ is projected onto the sea surface it should have sufficient beam energy density to induce non-linear propagation over the illuminated region. This spot region is then sensitized so that cross modulation occurs for other light sources that may traverse this region. The 1.06μ laser source $P_B$ serves to range on the sea surface, from height $h$, by detecting specular reflective returns from the surface. Detection of specular returns from an undulating surface requires that the projected spot size be of sufficient size to encompass several lengths of surface water waves. The laser beam source $P_C$ of 0.53μ penetrates the surface of the water and provides an echo return from the diffuse reflective target in depth $d$, and will modulate the 1.06μ laser beam $P_B$ when both are in the sensitive zone S illuminated by the 10.6μ laser source $P_A$. The echo signature of the target is then demodulated to retrieve the useful information. In order to maximize the amplitude modulation of the 1.06μ laser source by the 0.53μ penetrating laser beam, their energy levels should be matched approximately, within the sensitized region S.

As shown in FIG. 4 automatic depth determination is provided by use of an echo signal actuated clock. Lasers 10, 12 and 14 of FIG. 1 are triggered on simultaneously (FIG. 4a). $t_1$ is defined as the total transit time of laser beam B from the source to the water surface and return. $\Delta t$ is defined as the total transit time of laser beam C from the water surface to the target and return to the water surface. Echo return from the water surface starts the clock ($t_1 = 2h/v_{air}$, see FIG. 4b). Echo returns from the target stops the clock at $\Delta t$ and turns off laser 14. Target depth is then, $d = v_{water} \Delta t/2$. $v$ in water is approximately 740 ft per microsecond.

Figure 3:
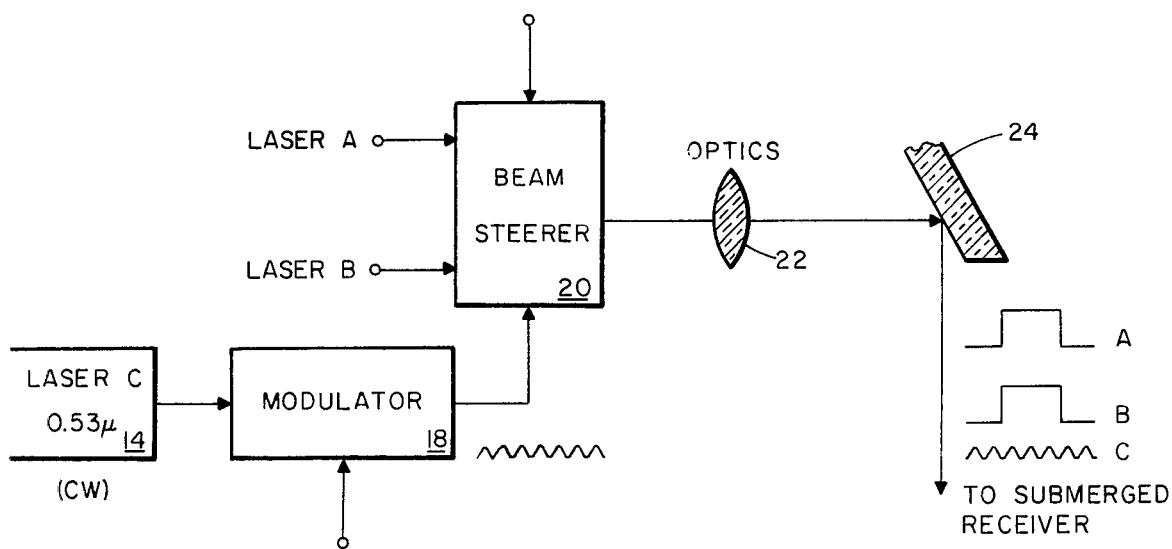
FIG. 3 shows a modification of the embodiment of FIG. 1.

For underwater communications and as shown in FIG. 3, CW laser source 14 is fed to a modulator 18 where intelligence signals are used to modulate the laser beam that is fed to beam steerer 20. The output beam from beam steerer 20 is collimated by means of optics 22 and directed by mirror 24 to the submerged receiver, not shown. A modulated laser beam from the submerged transmitter would be transmitted to the sensitized spot on the sea surface for crossmodulating the laser beam $P_B$ which is transmitted to rotating mirror 24 and the intelligence is detected in the same manner as the target echo information is detected in the system of FIG. 2.

Obviously many modifications and variations of the present invention are possible in the light of the above teachings. It is therefore to be understood that within the scope of the appended claims the invention may be practiced otherwise than as specifically described.

What is claimed is:

1. A system for detecting an object in water comprising:
   a. a first source of light energy waves being propagated on to the water surface for sensitizing an area of the water surface;
   b. a second source of light energy waves collimated with said first source being propagated to the sensitized area of the water and being reflected by said water surface;
   c. a third source of light energy waves collimated with said first and second light sources being propagated to the sensitized area for penetrating the water and upon reflection from a submerged body modulates said second light source that is reflected from the water surface;
   d. detector means for receiving the reflected modulated light source for detecting the presence of the submerged body.

2. The system of claim 1 wherein said first and second sources are pulsed and said third source is a continuous wave.

3. The system of claim 2 wherein said first light source is in the far infrared spectrum, said second light source is in the near infrared spectrum and said third light source is in the blue-green spectrum.

4. The system of claim 2 wherein said first light source is a laser emitting in the far infrared spectrum, said second light source is a laser emitting in the near infrared spectrum and said third light source is a laser emitting in the blue-green spectrum.

5. The system of claim 1 where the depth of the detected target is determined by starting a timing means in response to echo return from the water surface and stopping the timing means in response to echo returns from the object.

6. A system for communicating between an underwater station and a station above the water comprising:
   a. a first source of light energy waves being propagated on to the water surface for sensitizing a predetermined area of the water surface;
   b. a second source of light energy waves collimated with said first source being propagated to the sensitized area of the water and being reflected by said water surface;
   c. a third source of light energy modulated with intelligence signals and collimated with said first and second sources being propagated to the sensitized area for penetrating the water;

d. said light source reflected from the water surface being cross-modulated to provide specular transmission from the surface of the water to the station above the water.

7. The system of claim 6 wherein said first and second sources are pulsed and said third source in continuous wave.

8. The system of claim 7 wherein said first light source is in the far infrared spectrum, said second light source is in the near infrared spectrum and said third light source is in the blue-green spectrum.

9. The system of claim 7 wherein said first light source is a laser emitting in the far infrared spectrum, said second light source is a laser emitting in the near infrared spectrum and said third light source is a laser emitting in the blue-green spectrum.

10. A system for communicating between an underwater station and a station above the water comprising:
 a. a first source of light energy waves being propagated on to the water surface for sensitizing a predetermined area of the water surface;
 b. a second source of light energy waves collimated with said first source being propagated to the sensitized area of the water and being reflected by said water surface;
 c. a third source of water penetrating light energy modulated with sensitized signals and being propagated to said sensitized area for interacting with said second source of light energy waves producing non-linear cross modulation;
 d. said second light source being reflected from the water surface to provide specular transmission of the cross modulation products from the surface of the water to the station above the water.

* * * * *